US010337579B2

(12) United States Patent
Lamb

(10) Patent No.: US 10,337,579 B2
(45) Date of Patent: Jul. 2, 2019

(54) VIBRATION ISOLATION MOUNT FOR AN ELECTRIC MOTOR

(71) Applicant: Dyson Technology Limited, Wiltshire (GB)

(72) Inventor: James Hope Lamb, Malmesbury (GB)

(73) Assignee: Dyson Technology Limited, Malmesbury, Wiltshire (GB)

(*) Notice: Subject to any disclaimer, the term of this patent is extended or adjusted under 35 U.S.C. 154(b) by 220 days.

(21) Appl. No.: 14/046,310

(22) Filed: Oct. 4, 2013

(65) Prior Publication Data

US 2014/0097323 A1    Apr. 10, 2014

(30) Foreign Application Priority Data

Oct. 5, 2012  (GB) .................................. 1217873.7

(51) Int. Cl.
| | |
|---|---|
| *H02K 5/24* | (2006.01) |
| *A47L 9/22* | (2006.01) |
| *F16F 1/38* | (2006.01) |
| *F16F 1/373* | (2006.01) |
| *F16F 15/08* | (2006.01) |
| *A47L 9/00* | (2006.01) |

(52) U.S. Cl.
CPC .......... *F16F 1/3732* (2013.01); *A47L 9/0081* (2013.01); *A47L 9/22* (2013.01); *F16F 15/08* (2013.01); *H02K 5/24* (2013.01)

(58) Field of Classification Search
CPC .......... F16F 1/3732; F16F 15/08; F16F 15/10; F16F 15/12; A47L 9/0081; A47L 9/22; A47L 5/24; H02K 5/24; H02K 9/06; F04D 29/668; F04D 29/5813; F04D 29/162; F04D 29/5806

USPC ......... 310/89, 51, 91, 216.024, 431; 15/326; 248/638; 417/363; 416/190; 415/119
See application file for complete search history.

(56) References Cited

U.S. PATENT DOCUMENTS

| | | | | |
|---|---|---|---|---|
| 5,448,794 | A | * | 9/1995 | Walch ....................... A47L 9/22 15/326 |
| 5,632,562 | A | * | 5/1997 | Kidzun ..................... B62D 1/16 384/536 |
| 5,660,256 | A | * | 8/1997 | Gallmeyer .......... F16F 15/1442 188/379 |
| 5,875,562 | A | * | 3/1999 | Fogarty .................. A45D 20/10 34/97 |
| 6,021,993 | A | | 2/2000 | Kirkwood |

(Continued)

FOREIGN PATENT DOCUMENTS

| | | |
|---|---|---|
| DE | 1 125 603 | 3/1962 |
| DE | 196 20 960 | 8/1997 |

(Continued)

OTHER PUBLICATIONS

Buettner (EP 0806830 A2, English translation).*

(Continued)

*Primary Examiner* — Quyen P Leung
*Assistant Examiner* — Alexander Moraza
(74) *Attorney, Agent, or Firm* — Morrison & Foerster LLP

(57) ABSTRACT

A mount for an electric motor that is formed of an elastomeric material and includes a sleeve around which ribs are formed. The ribs include first ribs and second ribs, and the first ribs project further from the sleeve and are more compliant than the second ribs.

14 Claims, 3 Drawing Sheets

(56) References Cited

U.S. PATENT DOCUMENTS

| | | | |
|---|---|---|---|
| 6,045,112 A | 4/2000 | Kirkwood | |
| 7,243,894 B2 * | 7/2007 | Haregoppa | B06B 3/00 248/638 |
| 8,397,344 B2 | 3/2013 | Liddell | |
| 2002/0138941 A1 | 10/2002 | Paterson et al. | |
| 2004/0021393 A1 * | 2/2004 | Suzuki | H02K 1/185 310/216.012 |
| 2006/0260091 A1 | 11/2006 | Song et al. | |
| 2007/0080593 A1 | 4/2007 | O'Donnell | |
| 2009/0242145 A1 * | 10/2009 | Sheu | E06B 9/322 160/311 |
| 2010/0215500 A1 | 8/2010 | Jones et al. | |
| 2010/0223751 A1 * | 9/2010 | Liddell | A47L 5/24 15/326 |
| 2014/0035413 A1 | 2/2014 | Cowdry | |
| 2014/0328670 A1 * | 11/2014 | Lamb | F04D 29/668 415/119 |

FOREIGN PATENT DOCUMENTS

| | | | | |
|---|---|---|---|---|
| DE | 19620960 A1 * | 8/1997 | | A47L 9/0081 |
| DE | 20 2006 012 489 | 1/2008 | | |
| EP | 0 272 851 | 6/1988 | | |
| EP | 0 558 110 | 9/1993 | | |
| EP | 0806830 A2 * | 11/1997 | | H02K 5/04 |
| EP | 2 466 147 | 6/2012 | | |
| EP | 2 510 861 | 10/2012 | | |
| FR | 1255721 | 3/1961 | | |
| GB | 953057 | 3/1964 | | |
| GB | 953057 A * | 3/1964 | | A47L 9/22 |
| GB | 2 295 056 | 5/1996 | | |
| GB | 2513662 A * | 11/2014 | | A47L 5/24 |
| GB | 2513663 A * | 11/2014 | | F04D 29/059 |
| GB | 2513664 A * | 11/2014 | | F04D 29/056 |
| JP | 51-69711 | 6/1976 | | |
| JP | 54-84507 | 6/1979 | | |
| JP | 54-95813 | 7/1979 | | |
| JP | 54095813 U * | 7/1979 | | |
| JP | 63-39439 | 2/1988 | | |
| JP | 6-82451 | 11/1994 | | |
| JP | 9-203192 | 8/1997 | | |
| JP | 2001025204 A * | 1/2001 | | |
| JP | 2004-113944 | 4/2004 | | |
| NL | 250950 | 2/1964 | | |
| WO | WO-00/48293 | 8/2000 | | |
| WO | WO-03/058795 | 7/2003 | | |
| WO | WO-2011/009784 | 1/2011 | | |

OTHER PUBLICATIONS

Ibata et al. (JP 2001025204 A, English translation).*
JP 54095813 U (English Translation).*
EP 0806830 A2 (English Translation).*
Search Report dated Feb. 5, 2013, directed to GB Application No. 1217873.7; 1 page.
Lamb, U.S. Office Action dated Aug. 11, 2016, directed to U.S. Appl. No. 14/268,824; 6 pages.
Lamb, U.S. Office Action dated Mar. 1, 2017, directed to U.S. Appl. No. 14/268,824; 6 pages.
Lamb, U.S. Office Action dated Jun. 19, 2017, directed to U.S. Appl. No. 14/268,824; 6 pages.
Lamb, U.S. Office Action dated Oct. 11, 2017, directed to U.S. Appl. No. 14/268,824; 9 pages.
Lamb, U.S. Office Action dated Feb. 1, 2018, directed to U.S. Appl. No. 14/268,824; 10 pages.
Lamb, U.S. Office Action dated Jun. 26, 2018, directed to U.S. Appl. No. 14/268,824; 9 pages.
International Search Report and Written Opinion dated Feb. 5, 2014, directed to International Application No. PCT/GB2013/052538; 7 pages.
Lamb et al., U.S. Office Action dated Nov. 8, 2018, directed to U.S. Appl. No. 14/268,824; 7 pages.

* cited by examiner

VIBRATION ISOLATION MOUNT FOR AN ELECTRIC MOTOR

REFERENCE TO RELATED APPLICATION

This application claims priority of United Kingdom Application No. 1217873.7, filed Oct. 5, 2012, the entire contents of which are incorporated herein by reference.

FIELD OF THE INVENTION

The present invention is directed to a vibration isolation mount for an electric motor.

BACKGROUND OF THE INVENTION

In order to reduce the transmission of vibration from an electric motor to the surrounding housing, a mount formed of a flexible material is often located between the motor and the housing.

FIG. 1 illustrates a known type of motor mount. The mount 1 is formed of an elastomeric material and comprises a sleeve 2 that fits snugly around the motor, and a plurality of ribs 3 that extend axially along the outer surface of the sleeve 2. When mounted within the housing, each of the ribs 3 deforms so as to absorb vibration from the motor. Additionally, should the motor be dropped or otherwise subjected to an impact, the ribs 3 deform to absorb the acceleration and thus prevent damage to the motor.

A problem with the mount 1 of FIG. 1 is that, relatively speaking, the housing is poorly isolated from the motor. That is to say that a significant amount of vibration generated by the motor continues to be transmitted to the housing.

SUMMARY OF THE INVENTION

The present invention provides a mount for an electric motor, the mount being formed of an elastomeric material and comprising a sleeve around which a plurality of ribs are formed, wherein the ribs comprise first ribs and second ribs, and the first ribs project further from the sleeve and are more compliant than the second ribs.

The mount is intended to surround a motor so as to reduce the transmission of vibration from the motor to the housing of a product. The ribs may be located on the outer surface or the inner surface of the sleeve. During normal use of the product, the first ribs contact either the housing or the motor and deform to absorb vibration from the motor. The second ribs do not project as far as the first ribs. As a result, the second ribs do not contact the housing or motor during normal use. Consequently, in contrast to the mount of FIG. 1, the housing is better isolated from the motor. When the product is dropped or otherwise subjected to an impact, the resulting acceleration may cause one or more of the second ribs to contact the housing or motor. On contacting the housing or motor, the second ribs deform so as to reduce the acceleration imparted to the motor. As a result, damage to the motor, which might otherwise occur if the second ribs were omitted, is avoided. The mount therefore provides improved vibration isolation whilst continuing to protect the motor against impact damage.

The ribs may extend axially along the sleeve, i.e. in a direction parallel to the longitudinal axis of the sleeve. The axial length of a motor is generally shorter than the circumferential length. Accordingly, by employing ribs that extend axially, better isolation may be achieved. Additionally, where the motor is intended to be mounted within a recess, axial ribs make it easier to insert the motor and the mount into the recess. Furthermore, as the motor and mount are inserted into the recess, the first ribs deform radially and thus the compliance of the first ribs may be better controlled. In contrast, if the ribs were to extend circumferentially around the sleeve, the ribs would most likely deform axially rather than radially as the motor and mount are inserted into the recess. This may then alter the radial compliance of the ribs and thus adversely affect the efficacy of the ribs to absorb motor vibration.

The first ribs and the second ribs may be formed on the outer surface of the sleeve. This then has the advantage that the motor and the mount may be more easily inserted into a recess of the housing. In particular, when inserting the motor and mount axially into a recess, only the first ribs contact the housing and thus the friction generated between the mount and the housing is relatively small.

One or more second ribs may be located between pairs of first ribs. As a result, fewer first ribs are required in order to protect the motor from impact damage. By having fewer first ribs, the housing is better isolated from the motor during normal use.

Each of the first ribs may be hollow and each of the second ribs may be solid. This then simplifies the manufacture of a unitary mount formed of the same material and having ribs of different compliances.

An end of each of the first ribs may be tapered. This then has the advantage that, when inserting the motor and mount into a recess in the housing, damage to the ends of the ribs may be avoided. Additionally, the tapering encourages the ribs to deform radially as the motor and mount are inserted into the recess. As a result, better control may be achieved over the radial compliance of the first ribs.

The mount may comprise one or more stubs that project axially beyond an end of the sleeve. Each stub is then more compliant than that of the sleeve, at least in the axial direction. As a result, the mount is able to additionally absorb axial vibration and acceleration.

The mount may comprise one or more locking projections formed on an inner surface of the sleeve. The locking projections are intended to engage with corresponding recesses in the outer surface of the motor. When engaged with the recesses, the locking projections prevent the motor from rotating relative to the mount during use. Additionally, when inserting the motor and mount into a recess, the locking projections ensure that the motor remains secured to the mount during insertion and does not, for example, slide relative to the mount.

The present invention also provides a mount for an electric motor, the mount being formed of an elastomeric material and comprising a sleeve around which a plurality of ribs are formed, wherein the ribs are formed around an outer surface of the sleeve, the ribs comprise first ribs and second ribs that extend axially along the sleeve, one or more second ribs are located between pairs of first ribs, and the first ribs project further from the sleeve and are more compliant than the second ribs.

Again, the mount is intended to surround a motor so as to reduce the transmission of vibration from the motor to the housing of a product. During normal use of the product, the first ribs contact the housing or the motor and deform to absorb vibration from the motor. By contrast, the second ribs, which do not project as far as the first ribs, do not contact the housing or motor during normal use. However, when the product is dropped or otherwise subjected to an impact, the resulting acceleration causes one or more of the second ribs to contact the housing or motor. The resulting deformation of the second ribs then acts to reduce the acceleration imparted to the motor.

The axial length of a motor is generally shorter than the circumferential length. Accordingly, by employing ribs that extend axially along the sleeve, better isolation may be achieved. Additionally, where the motor is intended to be mounted within a recess, axial ribs make it easier to insert the motor and the mount into the recess, and the compliance of the first ribs may be better controlled.

Since ribs are formed on the outer surface of the sleeve, the motor and the mount may be more easily inserted into a recess of the housing. In particular, when inserting the motor and mount axially into a recess, only the first ribs contact the housing and thus the friction generated between the mount and the housing is relatively small.

One or more second ribs are located between pairs of first ribs. As a result, fewer first ribs are required in order to protect the motor from impact damage. By having fewer first ribs, the housing is better isolated from the motor during normal use.

Each of the first ribs may be hollow and each of the second ribs may be solid. This then simplifies the manufacture of a unitary mount formed of the same material and having ribs of different compliances.

An end of each of the first ribs may be tapered. This then has the advantage that, when inserting the motor and mount into a recess in the housing, damage to the ends of the ribs may be avoided. Additionally, the tapering encourages the ribs to deform radially as the motor and mount are inserted into the recess. As a result, better control may be achieved over the radial compliance of the first ribs.

The mount may comprise one or more stubs that project axially beyond an end of the sleeve. Each stub is then more compliant than that of the sleeve, at least in the axial direction. As a result, the mount is able to additionally absorb axial vibration and acceleration.

The mount may comprise one or more locking projections formed on an inner surface of the sleeve. The locking projections are intended to engage with corresponding recesses in the outer surface of the motor. When engaged with the recesses, the locking projections prevent the motor from rotating relative to the mount during use. Additionally, when inserting the motor and mount into a recess, the locking projections ensure that the motor remains secured to the mount during insertion and does not, for example, slide relative to the mount.

The present invention further provides a product comprising a housing, a motor, and a mount as described in any one of the preceding paragraphs, wherein the mount surrounds the motor, the first ribs contact one of the housing and the motor during normal use of the product to isolate the housing from the motor, the second ribs are spaced from the one of the housing and the motor during normal use of the product, and one or more second ribs contact the one of the housing and the motor when the product is subjected to an impact so as to reduce the acceleration imparted to the motor.

The mount may comprise one or more locking projections formed on an inner surface of the sleeve that engage with corresponding recesses in an outer surface of the motor. The locking projections help prevent the motor from rotating relative to the mount during use. Additionally, when inserting the motor and mount into the housing, the locking projections help ensure that the motor remains secured to the mount during insertion and does not, for example, slide relative to the mount.

BRIEF DESCRIPTION OF THE DRAWINGS

In order that the present invention may be more readily understood, embodiments of the invention will now be described, by way of example, with reference to the accompanying drawings, in which.

DETAILED DESCRIPTION OF THE INVENTION

Figure 2:
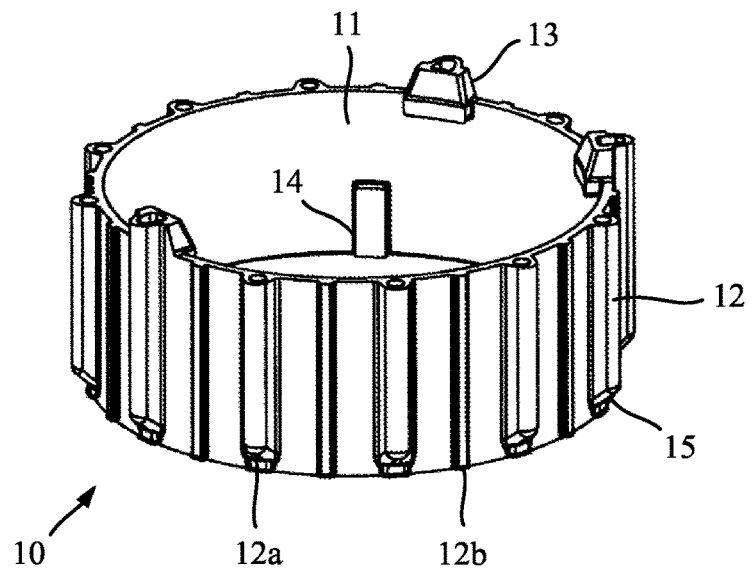
FIG. 2 is an axonometric view of a vibration isolation mount in accordance with the present invention.
Figure 3:
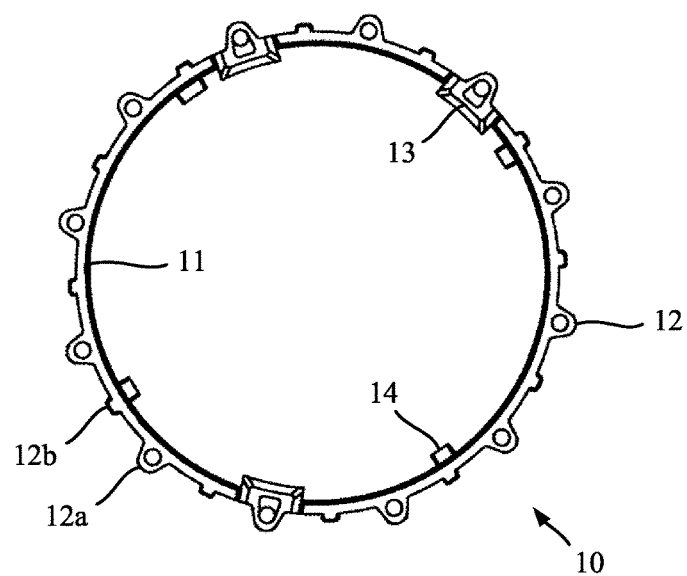
FIG. 3 is a plan view of the mount of FIG. 2.

The mount 10 of FIGS. 2 and 3 is a unitary component formed of an elastomeric material such as natural or synthetic rubber (e.g. EPDM). The mount 10 comprises a sleeve 11, a plurality of ribs 12, a plurality of end stubs 13 and a plurality of locking projections 14.

The ribs 12 are formed on the outer surface of the sleeve 11 and project radially outward. Each of the ribs 12 extends axially from approximately one end of the sleeve 11 to the opposite end. The ribs 12 comprise two different types of rib: first ribs 12a and second ribs 12b. The first ribs 12a project further from the sleeve 11 than the second ribs 12b. Furthermore, the first ribs 12a are more compliant (i.e. less stiff) that the second ribs 12b, at least in response to a radial force. The first and second ribs 12a,12b are arranged alternately around the sleeve 11 such that each second rib 12b is located between a pair of first ribs 12a.

Each of the first ribs 12a is hollow, which increases the compliance of the rib. In contrast, each of the second ribs 12b is solid, thereby resulting in a stiffer rib. An end 15 of each first rib 12a is tapered, for reasons that are described below.

Each of the end stubs 13 projects axially beyond an end of the sleeve 11. Additionally, each stub 13 projects radially inward from the sleeve 11. The compliance of each stub 13 is greater than that of the sleeve 11, at least in response to an axial force. The higher compliance is achieved by an axial hole formed through each stub 13.

The locking projections 14 are formed on the inner surface of the sleeve 11 and project radially inward. The shape of each locking projection 14 is generally rectangular.

The mount 10 is intended to surround an electric motor 16. Owing to the elasticity of the material used to form the mount 10, the sleeve 11 stretches over and forms an interference fit with the motor 16.

Each of the end stubs 13 engages with an end of the motor 16, and each of the locking projections 14 engages with a corresponding recess in the outer surface of the motor 16. The locking projections 14 act to align and retain the motor within the mount 10. Additionally, the locking projections 14 prevent the motor 16 from rotating relative to the mount 10.

Figure 4:
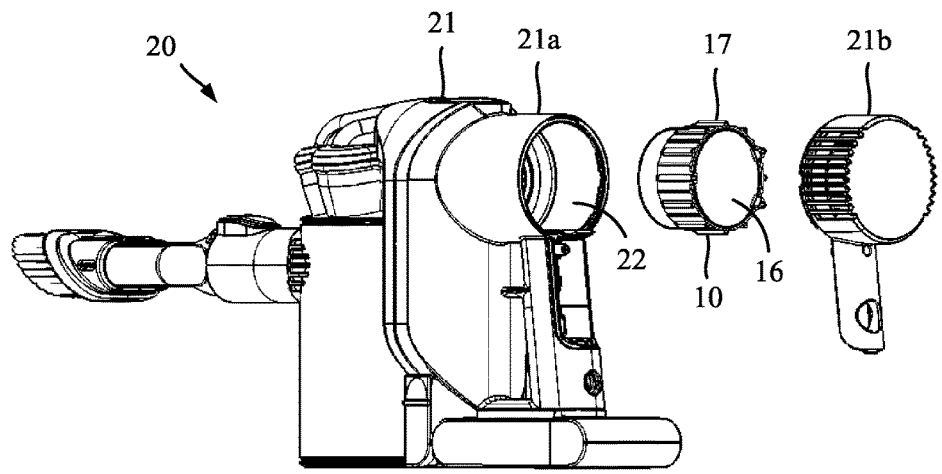
FIG. 4 is an exploded view of a product into which a motor surrounded by the mount of FIG. 2 are inserted.

Referring now to FIG. 4, the assembly 17 comprising the motor 16 and the mount 10 is intended to be mounted within the housing 21 of a product 20. In this particular example, the product 20 is a handheld vacuum cleaner. The housing 21 comprises a first portion 21a having cylindrical recess 22 into which the assembly 17 is inserted. The inner diameter of the recess 22 is smaller than the outer diameter of the mount 10. As a result, on inserting the motor-mount assembly 17 into the recess 22, the first ribs 12a contact the housing 21 and deform. The ends of the first ribs 12a are tapered. This then makes it easier to insert the motor-mount assembly 17 into the recess 22. Additionally, tapering helps avoid damage to the ends of the ribs 12a during insertion, and encourages the ribs 12a to deform radially. Without tapering at the ends, the ribs 12a could conceivably deform in an uncontrolled way. For example, the ribs 12a may bend to the left or right rather than deforming radially. This would then affect the radial compliance of the ribs 12a and thus affect the efficacy of the ribs 12a to absorb motor vibration.

As noted above, the locking projections 14 of the mount 10 engage with recesses in the outer surface of the motor 16. As a result, the motor 16 is held securely to the mount 10 as the assembly is inserted into the recess 22. In particular, the motor 16 is prevented from sliding relative to the mount 10 during insertion.

Figure 1:
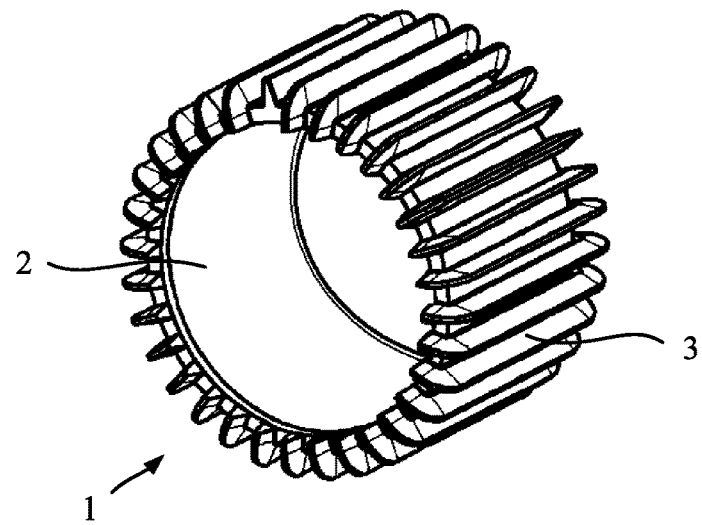
FIG. 1 is an axonometric view of a known type of vibration isolation mount.

None of the second ribs 12b contact the housing 21 during insertion of the assembly 17. Accordingly, in contrast to the mount 1 of FIG. 1, the motor-mount assembly 17 is easier to insert into the housing 21 owing to the fewer points of contact.

After inserting the motor-mount assembly 17 into the recess 22, a second portion 21b of the housing is secured to the first portion 21a so as to enclose the motor-mount assembly 17. When mounted within the housing 21, the first ribs 12a and the end stubs 13 contact the housing 21 and deform slightly such that the assembly 17 is held securely within the housing 21. If required, an additional mount may be provided at the opposite end of the motor 16 in order to absorb axial forces acting in a direction away from the end stubs 13.

During use of the product 20, the first ribs 12a deform further to absorb radial vibration from the motor 16, and the end stubs 13 deform to absorb axial vibration. Importantly, the second ribs 12b are spaced from the housing 21 during normal use of the motor 16. Accordingly, in contrast to the mount 1 of FIG. 1, fewer ribs 12 contact the housing 21. The housing 21 is therefore better isolated from the motor 16 and thus less of the vibration from the motor 16 is transferred to the housing 21.

The product 20 is intended to withstand a drop from a given height onto a given surface. As the product 20 impacts the surface, the product 20 experiences a relatively high acceleration. The rated acceleration of the product 20 may greatly exceed that of the motor 16. Consequently, if the full acceleration of the product 20 were imparted to the motor 16, the motor 16 may be damaged. Fortunately, as will now be explained, the mount 10 absorbs the product acceleration such that the acceleration imparted to the motor 16 is less than that rated for the motor 16. As a result, potential damage to the motor 16 is averted.

The acceleration of the housing 21 relative to the motor 16 may be resolved into a radial component and an axial component. The magnitudes of the components will depend on the orientation of the product 20 at the moment of impact.

Radial acceleration of the housing 21 causes one or more of the first ribs 12a to deform. In deforming, the ribs 12a act to absorb the product acceleration and thus reduce the acceleration imparted to the motor 16. Depending on the magnitude of the radial acceleration, the first ribs 12a may deform beyond that experienced during normal use of the product 20. Indeed, the first ribs 12a may deform to such an extent that the housing 21 contacts one or more of the second ribs 12b. The second ribs 12b then deform to further absorb the product acceleration. The first and second ribs 12 are configured such that, at the rated acceleration of the product 20, the radial acceleration imparted to the motor 16 is less than that rated for the motor 16.

Axial acceleration of the housing 21 causes the end stubs 13 to deform and thus absorb the product acceleration. Again, the end stubs 13 are configured such that, at the rated acceleration of the product 20, the axial acceleration imparted to the motor 16 is less than that rated for the motor 16.

By ensuring that the acceleration imparted to the motor 16 is less than that rated for the motor 16, the mount 10 protects the motor 16 against potential damage should the product 20 be dropped or otherwise subjected to an impact. At the rated acceleration for the product 20, the ribs 12 and the end stubs 13 prevent the housing 21 from contacting the sleeve 11 of the mount 10. The sleeve 11 is relatively stiff and thus should the housing 21 contact the sleeve 11 a larger acceleration would be imparted to the motor 16. Indeed, the acceleration imparted to the motor 16 may exceed the rated acceleration for the motor 16. By ensuring that the housing 21 does not contact the sleeve 11, potential damage to the motor 16 may be averted.

The mount 10 therefore serves two important functions. First, the mount 10 isolates the housing 21 from the motor 16. Second, the mount 10 protects the motor 16 against impact to the housing 21.

The configuration of the ribs 12 (e.g. the number of ribs 12, the spacing of the ribs 12, the number of second ribs 12b between each pair of first ribs 12a, the compliances of the ribs 12, the sizes of the ribs, etc.) will depend on the particular requirements of the motor 16 and the product 20. For example, the primary role of the first ribs 12a is to isolate vibration from the motor 16. Accordingly, the compliance of the first ribs 12a is likely to be determined primarily by the vibrational frequencies of the motor 16. The size, number and spacing of the first ribs 12a should ideally ensure that the housing 21 contacts only the first ribs 12a during normal use of the product 20. Should the housing 21 contact the second ribs 12b or the sleeve 11, more of the motor vibration will be transmitted to the housing 21. The primary role of the second ribs 12b is to ensure that motor 16 is not damaged should the product 20 be dropped or otherwise subjected to an impact. Accordingly, the compliance, size and spacing of the second ribs 12b are likely to be determined by, among other things, the rated acceleration of the product 20 and the rated acceleration of the motor 16. To this end, the mount 10 may comprise a plurality of second ribs 12b between each pair of first ribs 12a.

Figure 5:
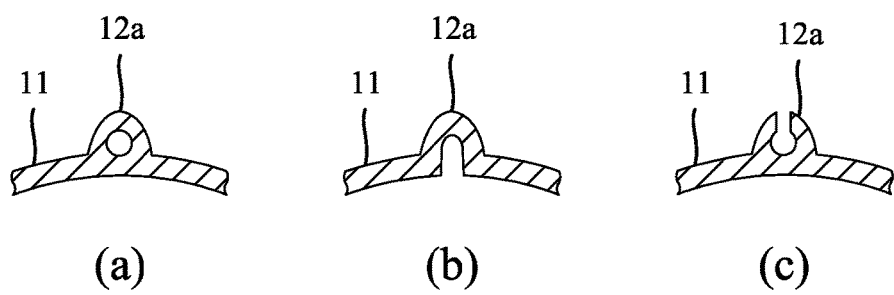
FIG. 5 illustrates alternative profiles for the ribs of the mount of FIG. 2.

The higher compliance of the first rib 12a is achieved by employing a hollow rib. However, the compliance of the first rib 12a may be achieved using an alternative profile. By way of example, FIG. 5 illustrates alternative profiles that might equally be used to achieve the required compliance. Similarly, the compliance of the end stubs 13 may be achieved using an alternative profile. For example, each end stub 13 may be formed as a number of axial prongs.

In the example illustrated in FIG. 4, the motor-mount assembly 17 is inserted axially into a cylindrical recess 22 within the housing 21. This then has the advantage of simplifying the manufacture and assembly of the product 20. Alternatively, however, the housing 21 may comprise a number of parts (e.g. two semi-cylindrical parts) that, when assembled, encircle the motor-mount assembly 17. It is not then necessary to insert the motor-mount assembly 17 axially into the housing 21. Consequently, it is not necessary to taper the ends of the first ribs 12a.

Rather than extending axially along the sleeve 11, the ribs 12 could equally extend circumferentially around the sleeve 11. However, ribs 12 that extend axially have at least two advantages. First, the axial length of an electric motor 16 is generally shorter than the circumferential length. Consequently, by having ribs 12 that extend axially rather than circumferentially, better isolation may be achieved owing to the shorter lengths of the ribs 12. Second, where the motor-mount assembly 17 is intended to be inserted axially into a recess 22, the friction between the first ribs 12a and the housing 21 is smaller when the ribs 12a extend axially. Additionally, circumferential ribs would deform in an undesirable way as the motor-mount assembly 17 is inserted into the recess 22. In particular, rather than deforming radially, the ribs 12a are likely to deform axially during insertion. As a result, the radial compliance of the first ribs 12a will be affected and thus the efficacy of the first ribs 12a to absorb motor vibration may be adversely affected.

Conceivably, the ribs 12 may be formed around the inner surface of the sleeve 11. The outer surface of the sleeve 11 would then contact the housing 21, the first ribs 12a would contact the motor 16, and the second ribs 12b would be spaced from the motor 16. This particular design could be used, for example, when the housing 21 comprises a number of parts (e.g. two semi-cylindrical parts) that are made to encircle the motor-mount assembly 17. However, when the motor-mount assembly 17 is intended to be inserted axially into a recess 22, the friction between the sleeve 11 and the housing 21 would most likely make insertion difficult. By having the ribs 12 located of the outer surface of the sleeve 11, insertion of the motor-mount assembly 17 is made easier, thus simplifying the manufacture of the product 20.

In comprising both ribs 12 and end stubs 13, the mount 10 acts to absorb both radial and axial vibration and acceleration. Nevertheless, there may be instances for which the mount 10 is not required to absorb axial vibration or acceleration, and thus the end stubs 13 may be omitted. For example, a separate axial mount may be provided for absorbing axial vibration and acceleration.

The locking projections 14 serve two useful functions. First, the locking projections 14 prevent the motor 16 from rotating relative to the mount 10 during use. Second, when inserting the motor-mount assembly 17 into a recess 22, the locking projections 14 prevent the motor 16 sliding axially relative to the mount 10. Nevertheless, the locking projections 14 are not essential for vibration isolation or for impact protection and may therefore be omitted.

The invention claimed is:

1. A mount for an electric motor, the mount being formed of an elastomeric material and comprising a sleeve around which a plurality of ribs are formed, wherein the mount is disposed between the electric motor and a motor housing, wherein the ribs comprise first ribs and second ribs, and the first ribs project further from the sleeve than the second ribs, such that the first ribs deform before the second ribs when the mount absorbs radial acceleration;
wherein the mount comprises one or more locking projections formed on an inner surface of the sleeve, and
wherein each first rib includes a void disposed along a length of the rib so as to make the first ribs more compliant to radial acceleration than the second ribs.

2. The mount of claim 1, wherein the first ribs and the second ribs extend axially along the sleeve.

3. The mount of claim 1, wherein the first ribs and the second ribs are formed around an outer surface of the sleeve.

4. The mount of claim 1, wherein one or more second ribs are located between pairs of first ribs.

5. The mount of claim 1, wherein each of the first ribs is hollow and each of the second ribs is solid.

6. The mount of claim 1, wherein an end of each of the first ribs is tapered.

7. The mount of claim 1, wherein the mount comprises one or more stubs that project axially beyond an end of the sleeve, each stub being more compliant than the sleeve.

8. A product comprising a housing, a motor, and a mount as claimed in claim 1, wherein the mount surrounds the motor, the first ribs contact one of the housing and the motor during normal use of the product to isolate the housing from the motor, the second ribs are spaced from the one of the housing and the motor during normal use of the product, and one or more second ribs contact the one of the housing and the motor when the product is subjected to an impact so as to reduce the acceleration imparted to the motor.

9. The product of claim 8, wherein the one or more locking projections formed on an inner surface of the sleeve engage with corresponding recesses in an outer surface of the motor.

10. A mount for an electric motor, the mount being formed of an elastomeric material and comprising a sleeve around which a plurality of ribs are formed, wherein the mount is disposed between the electric motor and a motor housing, wherein the ribs are formed around an outer surface of the sleeve, the ribs comprise first ribs and second ribs that extend axially along the sleeve, one or more second ribs are located between pairs of first ribs, and the first ribs project further from the sleeve than the second ribs such that the first ribs deform before the second ribs when the mount absorbs radial acceleration, wherein each first rib includes a void disposed along a length of the rib so as to make the first ribs more compliant to radial acceleration than the second ribs, and wherein the mount comprises one or more locking projections formed on an inner surface of the sleeve.

11. The mount of claim 10, wherein each of the first ribs is hollow and each of the second ribs is solid.

12. The mount of claim 10, wherein an end of each of the first ribs is tapered.

13. The mount of claim 10, wherein the mount comprises one or more stubs that project axially beyond an end of the sleeve, each stub being more compliant than the sleeve.

14. The mount of claim 10, wherein the mount is included in a product that comprises a housing and a motor, the mount surrounds the motor, the first ribs contact one of the housing and the motor during normal use of the product to isolate the housing from the motor, the second ribs are spaced from the one of the housing and the motor during normal use of the product, and one or more second ribs contact the one of the housing and the motor when the product is subjected to an impact so as to reduce the acceleration imparted to the motor.

* * * * *